United States Patent
Choi et al.

(10) Patent No.: US 6,707,851 B1
(45) Date of Patent: Mar. 16, 2004

(54) METHOD FOR OBJECTS SEGMENTATION IN VIDEO SEQUENCES BY OBJECT TRACKING AND USER ASSISTANCE

(75) Inventors: Jae Gark Choi, Daejeon (KR); Myoung Ho Lee, Daejeon (KR); Jin Suk Kwak, Daejeon (KR); Munchurl Kim, Daejeon (KR); Chieteuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 09/701,822
(22) PCT Filed: Oct. 26, 1998
(86) PCT No.: PCT/KR98/00335
§ 371 (c)(1), (2), (4) Date: Jan. 26, 2001
(87) PCT Pub. No.: WO99/63750
PCT Pub. Date: Dec. 9, 1999

(30) Foreign Application Priority Data

Jun. 3, 1998 (KR) .............................................. 98-20687

(51) Int. Cl.[7] .............................. H04B 1/66; H04N 7/18
(52) U.S. Cl. .................................. 375/240.01; 382/236
(58) Field of Search ....................... 375/240.01, 240.15, 375/240.16; 348/609, 700, 143; 382/103, 236, 164; H04N 7/18; H04B 1/66

(56) References Cited

U.S. PATENT DOCUMENTS

| | | | | |
|---|---|---|---|---|
| 5,852,673 A | * | 12/1998 | Young | 382/164 |
| 5,969,755 A | * | 10/1999 | Courtney | 348/143 |
| 6,137,913 A | * | 10/2000 | Kwak et al. | 382/236 |

* cited by examiner

Primary Examiner—Chris Kelley
Assistant Examiner—Tung Tu Vo
(74) Attorney, Agent, or Firm—Blakely, Sokoloff, Taylor & Zafman

(57) ABSTRACT

A video object segmentation method applicable to a video system is presented. The method includes primarily segmenting objects existing in a frame of a video sequence manually or semi-manually. The objects within a video sequence including the primarily segmented object are automatically segmented. The method also determines whether any scene change is made between consecutive frames or any new object other than the primarily segmented object appears within the video sequence being automatically segmented, when repeatedly performing automatically segmenting the objects within the video sequence for consecutive frames. And, the method repeatedly performs primarily segmenting objects existing in a frame of a video sequence manually or semi-manually if it is determined that any scene change is made between consecutive frames or any new object other than the primarily segmented object appears within the video sequence being automatically segmented.

6 Claims, 3 Drawing Sheets

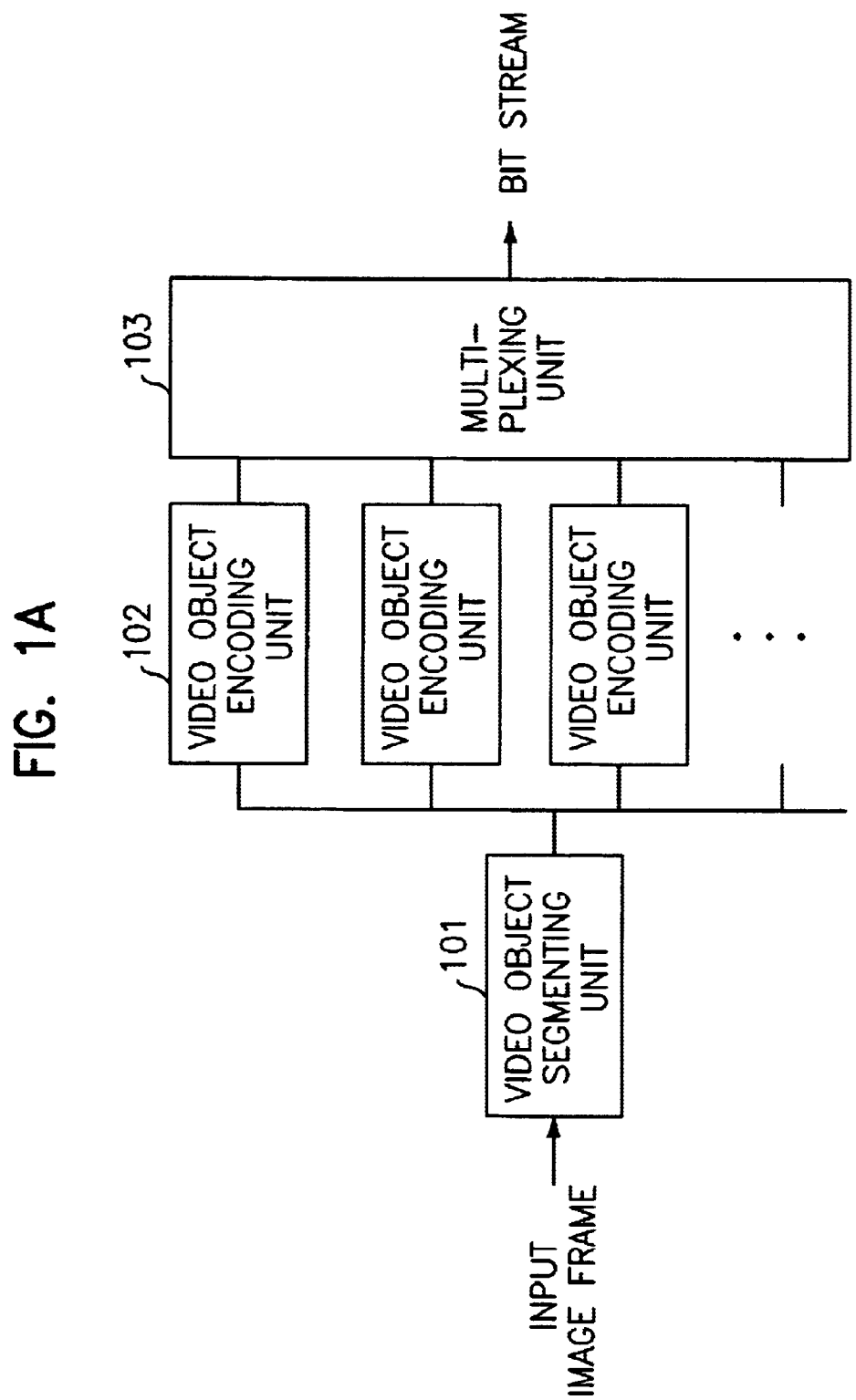

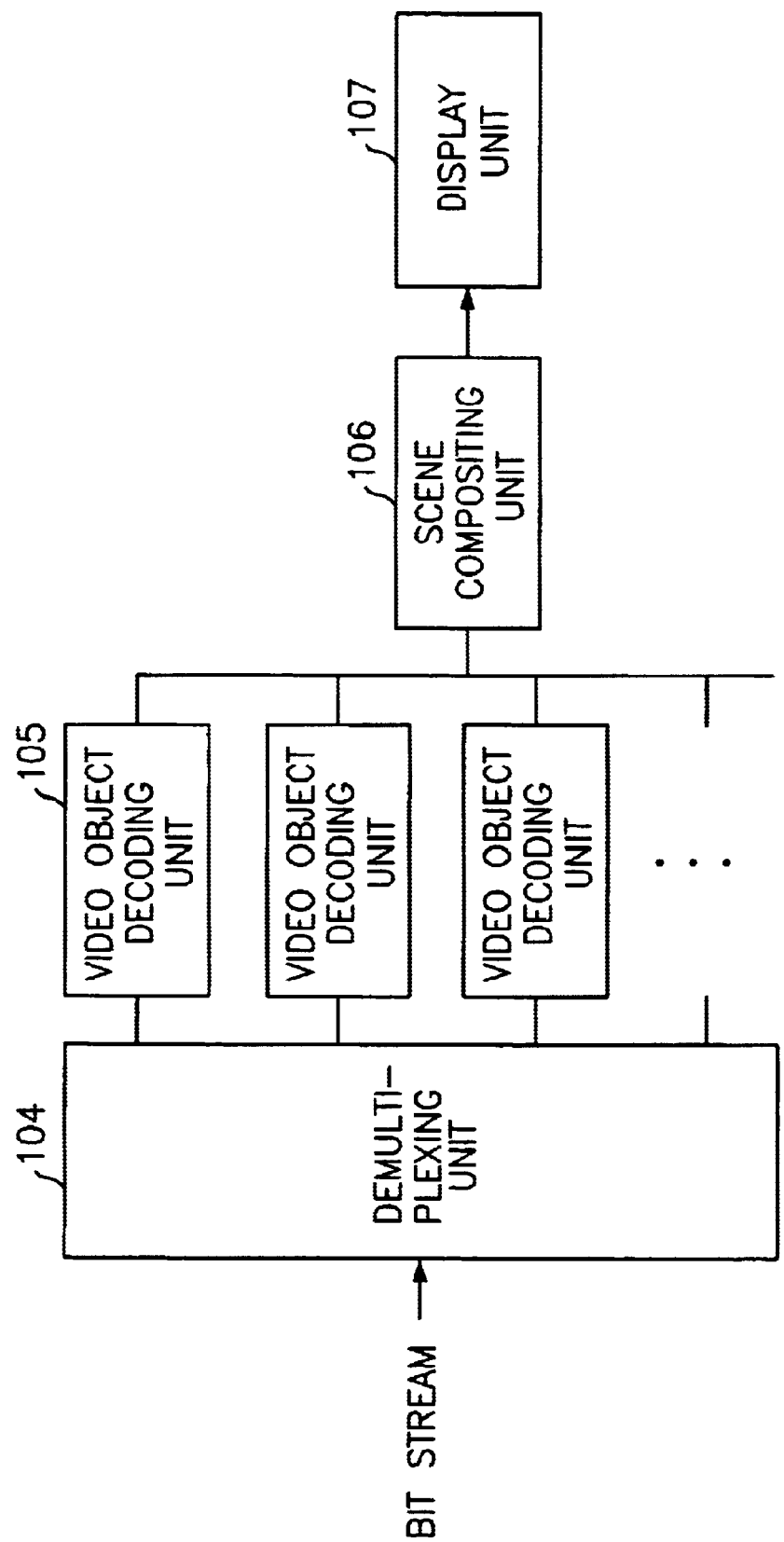

METHOD FOR OBJECTS SEGMENTATION IN VIDEO SEQUENCES BY OBJECT TRACKING AND USER ASSISTANCE

DESCRIPTION

1. Technical Field

The present invention relates to a video object segmentation method for correctly segmenting a video into a plurality of video objects by a user's assistance and an object tracking, when a video object-oriented manipulation, an editing, an object-based user interaction, an object-based video coding and the like are performed in an apparatus such as a video editing, creating and compositing apparatus, and an object-based video codec (or encoder/decoder).

2. Background Art

According to conventional video object segmentation methods, objects in image are automatically segmented based on the determination whether the brightness values of consecutive images are different or not, or are manipulatively segmented for every frame by user using an editing tool.

In the conventional video object segmentation methods, the automatic segmentation method causes the problem in that the segmentation capability is varied in accordance with the threshold value on which it is determined that the brightness value between the consecutive images is changed, and the manipulative segmentation method has the problem in that it takes a considerably long time because the segmentation of every frame requires the user's direct manipulation work, thus it endows the user with the economical burden.

Accordingly, the present invention is devised for solve the above problems. The objective of the present invention is to provide a video object segmentation method for correctly segmenting a video object, in which the video objects to be firstly appeared in an image sequence are segmented in manual or in semi-manual, and then the following video frames are automatically segmented by an object-tracking based on the moving of the primarily segmented video object, for the sake of detecting an object from an image in a video system.

DISCLOSURE OF INVENTION

To accomplish the objective of the present invention, there is provided a video object segmentation method applicable to a video system, comprising the steps of: primarily segmenting an object existing in a frame of video sequence manually or semi-manually; and secondly segmenting the object within a video sequence including the primarily segmented object automatically.

In one preferred embodiment of the present invention, the video object segmentation method further includes the steps of: determining whether any scene change is made between consecutive frames or any new object other than the primarily segmented object appears within the frame being automatically segmented, when repeatedly performing the step of secondly segmenting for consecutive frames; and repeating the step of primarily segmenting, if the answer of the step of determining is positive. This method also includes the steps of examining the quality of automatically segmented results,; repeating the step of secondly segmenting, if the quality of automatically segmented results is satisfactory; and repeating the step of primarily segmenting, if the quality of automatically segmented results is not satisfactory.

In addition, the step of primarily segmenting can be made by segmenting the object within the image in completely manual using an user interface tool, or by segmenting the object within the image in semi-manual, such that, if the user designates manually a rough boundary line of the object within the image, then the object within the image is automatically segmented based on the designation-related information and an image segmentation information. The step of secondly segmenting can be made by tracking the object region to which in the current frame the primarily segmented video object in the previous frame is moved, so as to segment the object within the frame of the consecutive frames.

BRIEF DESCRIPTION OF DRAWINGS

For a more complete understanding of the present invention and the advantage thereof, reference is now made to the following description taken in conjunction with the accompanying drawings in which:

FIGS. 1a and 1b are diagrams of an exemplary video codec to which the method of the present invention may be applied.

BEST MODE FOR CARRYING OUT THE INVENTION

Figure 2:
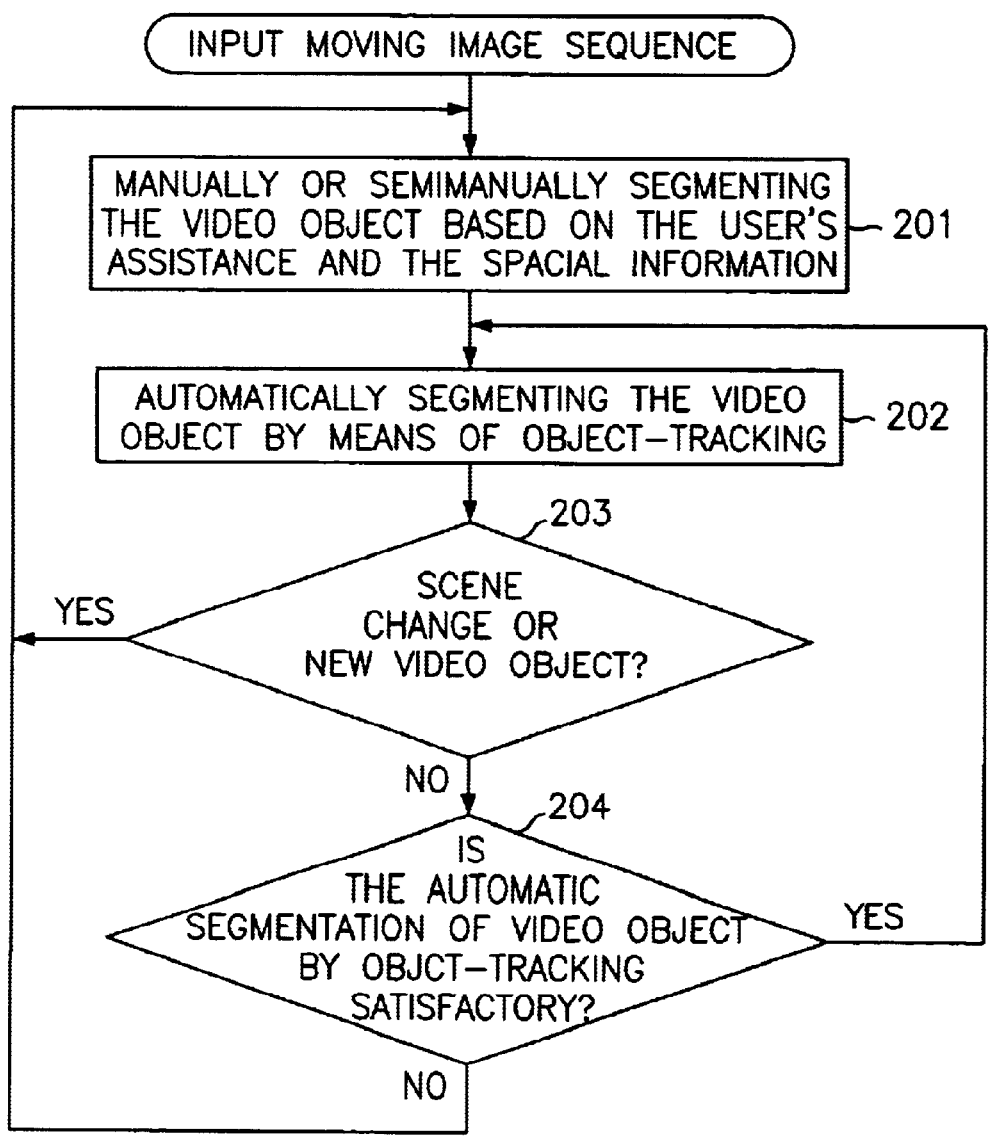
FIG. 2 is a flowchart for illustrating a preferred embodiment of a video object segmentation method according to the present invention.

The preferred embodiment of the present invention will hereinafter be described in detail with reference to the accompanying drawings.

FIGS. 1a and 1b are exemplary diagrams of a video codec to which the method of the present invention can be applied.

Referring to FIG. 1a, the video encoding part to which the method of this invention is applied, includes a video object segmentation unit 101 for segmentation an externally input video sequences into video objects, a plurality of video object encoding units 102 for video-object-oriented coding the video objects inputted from the video object segmentation unit 101 according to the MPEG-4 (Moving Picture Expert Group-4) video coding algorithm so as for reducing the video object data, and a multiplexing unit 103 for multiplexing the reduced video object data inputted from the plurality of video object coding unit 102 according to the MPEG-4 multiplexing standard and then transmitting/storing the multiplexed bit stream.

Referring to FIG. 1b, the video decoding part to which the method of this invention is applied, includes a de-multiplexing unit 104 for de-multiplexing the transmitted/reproduced bit stream data, a plurality of video object decoding unit 105 for decoding the de-multiplexed video objects inputted from the de-multiplexing unit 104, a picture compositing unit 106 for reconstructing a picture based on the decoded video objects inputted from the plurality of video object decoding unit 105, and a display unit 107 for displaying the reconstructed picture of the picture compositing unit 106 to the display unit.

FIG. 2 is a flowchart of a video object segmentation method according to one embodiment of the present invention.

First, when the video intended to be segmented is input, the video objects appeared in the first frame of the video sequence or the newly appeared video objects in the consecutive frames, are manually segmented by user or semi-manually segmented by user's manipulation based on the spatial information such as luminance, color or the like (see step 201).

For example it is impossible that an exact mathematical modeling for the video object on video sequences can be made and the measure for segmenting the video objects can be defined. Thus, the user segments in manual the video objects shown in the first frame or the newly appeared video objects in the consecutive frames by using a simple user interface tool such as a mouse, or segments semi-manually them by user's manipulation based on spatial information. More specifically, if the user simply designates in manual a rough boundary line of the object within the frame, then the object within the frame is automatically segmented based on the designation-related information and an image segmentation information.

Therefore, the video object is defined and segmented by the user's manipulation if it is one of the first frame of the video sequence, the frame on which the new object is revealed, or the frame on which a scene change is made from the previous frame, Second, the video object is automatically segmented by performing object-tracking based on the moving of the video object which has been defined and segmented in the previous frame (step 202).

For example, an estimation is made for the object region to which the video object having been segmented in the previous frame is moved and the video object on the previous segmented mask is projected into the segmented mask of the present frame in accordance with the moved amount. Here, an error and noise of the segmentation mask generated due to the projection is compensated and corrected, and then the pixel having an segmentation labeling uncertain due to the projection, for the segmentation mask, is segmented into an uncertain area. Then using the spatial information such as the luminance and color information of the current frame, the pixel of the uncertain area is segmented into the nearest video object. Here, a median filter is used for the segmentation mask having been last segmented. This is for the sake that the outline of the video object is streamlined so as to give a visually good effect.

Next, in step 203, it is analyzed whether a scene change is made or a newly appeared video object is in the next frame. That is, before segmentation of the video object, it is detected whether a scene change occurs in the consecutive frames or any newly appeared video object other than the segmented video objects exists.

If the result of the analysis shows that any scene change is made or any new object exists in the frame, the objects which are newly appeared or exist in the changed scene are segmented by manually or semi-manually by user's assistance (step 201).

If the result of the analysis shows that there is no scene change and any new object does not exist in the frame, in step 204 it is determined whether the automatic segmentation result by object-tracking for the previous frame is satisfactory. This is that, since the segmentation by object-tracking is performed using the video object segmented in previous frame, the erroneous segmentation for the previous result cumulatively affects the following segmentation by object-tracking to become incorrect. Here, the satisfaction examination for the segmentation result can be manually performed based on the user's determination or can be automatically performed.

When the segmentation result by object-tracking is "unacceptable", in step 201 the segmentation process by user's assistance. Otherwise, in step 202 the segmentation process by object-tracking for the next frame is performed.

According to one preferred embodiment of the present invention, the video object segmentation method segments the video object from the video sequences using various information such as a user's assistance, spatial information, temporal information of object-tracking and the like, so as to reduce the time required for segmentation and the user's endeavor and improve the correctness of the automatic video object segmentation.

As described above, according to the present invention, the desired object can be effectively segmented from the video sequences using an user's assistance, spatial information, temporal information related to object-tracking or the like. Also the video object intractable to be defined or segmented is manually or semi-manually segmented by user's assistance, and thus-segmented video object is automatically segmented by object-tracking. In other words, the effective combination of the automatic segmentation and the manual segmentation methods makes it possibly that the video objects are correctly segmented and the user's endeavor and time can be reduced. Thus, the method of the present invention has an effect that it can be applied to a video editing, creating and compositing apparatus, an object-based video codec or the like.

Although preferred embodiments of the present invention has been illustrated and described, various alternatives, modifications and equivalents may be used. Therefore, the foregoing description should not be taken as limiting the scope of the present invention which is defined by the appended claims.

What is claimed is:

1. A video object segmentation method applicable to a video system, comprising the steps of:
   a) primarily segmenting objects existing in a frame of a video sequence manually or semi-manually;
   b) automatically segmenting the objects within a video sequence including the primarily segmented object;
   c) determining whether any scene change is made between consecutive frames or any new object other than the primarily segmented object appears within the video sequence being automatically segmented, when repeatedly performing the step b) for consecutive frames; and
   d) repeatedly performing the step a), if the answer of the step c) is positive.

2. The video object segmentation method in accordance with the claim 1, further comprising the steps of:
   e) examining the quality of automatically segmented results, if there is no scene change between consecutive frames and any new object other than the primarily segmented object does not appear within the video sequence being automatically segmented;
   f) performing the step b), if the quality of automatically segmented results is satisfactory; and
   g) repeatedly performing the first step, if the quality of automatically segmented results is not satisfactory.

3. The video object segmentation method in accordance with claim 1 or 2, wherein the step a) is made by segmenting the objects within the frame in completely manual using an user interface tool.

4. The video object segmentation method in accordance claim 1 or 2, wherein the step a) is made by segmenting the object within the frame in semi-manual, such that, if the user designates manually a rough boundary line of the object within the frame, then the object within the frame is automatically segmented based on the designation-related information and an image segmentation information.

5. The video object segmentation method in accordance with the claim 1, wherein the step b) comprises the step of:

tracking the object region in the current frame to which the primarily segmented video object in the previous frame is moved, so as to segment the object within the frame of the consecutive frames.

6. The video object segmentation method in accordance with the claim 4, wherein the image segmentation information is a spatial information, including a brightness information and a color information.

* * * * *